2,816,896

PROCESS FOR THE PRODUCTION OF 2,3,5,6 TETRAHYDRO-1-IMIDAZ (1,2-a) IMIDAZOLE

Arthur Ferguson McKay and Ross Oliver Braun, Pointe Claire, and Gerard Yvon Paris, Ville La Salle, Quebec, Canada, assignors to Monsanto Canada Limited, La Salle, Quebec, Canada, a body politic and corporate No Drawing. Application January 28, 1957
Serial No. 636,490

2 Claims. (Cl. 260—309.6)

This invention relates to a new process for the production of 2,3,5,6-tetrahydro-1-imidaz (1,2-a) imidazole.

This compound and a method of its preparation are described in the Journal of the American Chemical Society, vol. 78, page 6144, 1956, A. F. McKay, W. G. Halton, and R. O. Brown. The present application relates to an improved process.

The new process involves the simultaneous removal of sulfur from and cyclization of 1-(beta-aminoethyl)-2-imidazolidinethione. This can be done by heating an aqueous solution of 1-(beta-aminoethyl)-2-imidazolidinethione in the presence of an inorganic reagent for example silver nitrate, silver oxide or mercuric oxide or an organic reagent for example chloro-acetic acid.

The preferred process is to reflux 1-(beta-aminoethyl)-2-imidazolidinethione in water containing chloroacetic acid. While the reaction time is not too critical, similar high yields are obtained within about two to about eight hours. Solvents other than water can be used. If benzene is used, the reaction products are insoluble and they separate out as an oily bottom layer.

The activity of the metallic salts and oxides used is important. For example, lead acetate will remove sulfur from 1-(beta-aminoethyl)-2-imidazolidinethione, but the reaction is too slow, moreover, addition of water to the bicyclic compound 2,3,5,6-tetrahydro-1-imidaz (1,2-a) imidazole results in a monocyclic structure being obtained.

The overall reaction of 1-(beta-aminoethyl)-imidazolidinethione with chloroacetic acid may be represented by the following equation

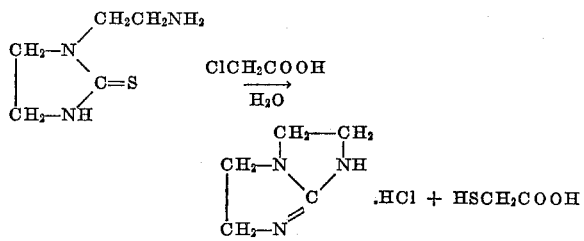

This process gives better yields of 2,3,5,6-tetrahydro-1-imidaz (1,2-a) imidazole and it is more economical than the existing process as described in the literature.

1-imidaz (1,2-a) imidazole is an intermediate for the formation of its vinyl derivative. The vinyl derivative can, by addition polymerization and copolymerization, be converted into useful polymers.

The following examples illustrate the invention in preferred aspects.

Example I

Five parts of 1-(beta-aminoethyl) - 2 - imidazolidinethione in water (100 parts) were treated with chloroacetic acid (3.21 parts). After the solution was refluxed for four hours, it was cooled to room temperature and extracted with ether. The aqueous fraction was evaporated to dryness in vacuo. A portion of the residual oil on treatment with aqueous picric acid solution gave a crystalline picrate (M. P. 218–219° C.) in 77.3% yield. This picrate on analysis gave 38.50% carbon, 3.36% hydrogen and 24.52% nitrogen compared with the theoretical calculated for the picrate of 2,3,5,6-tetrahydro-1-imidaz (1,2-a) imidazole of 38.80% carbon, 3.55% hydrogen and 24.70% nitrogen.

The oil, which consisted of a mixture of 2,3,5,6-tetrahydro-1-imidaz (1,2-a) imidazole salts and acetic acid derivatives was dissolved in 160 parts of water. This solution was passed through a column of IRA–400 resin (in the hydroxyl form). The column was then washed with 740 parts of water and the eluate and washings were combined. This solution on evaporation to dryness in vacuo gave 4 parts of an oily solid. The oily solid on crystallization from acetone gave 0.7 part (24.5%) of 2,3,5,6-tetrahydro-1-imidaz (1,2-a) imidazole (M. P. 158–159° C.). This compound on analysis gave 54.07% carbon, 8.16% hydrogen and 37.58% nitrogen compared with the theoretical calculated for $C_5H_9N_3$ of 54.03% carbon, 8.16% hydrogen and 38.83% nitrogen.

The filtrate on picrate analysis was found to contain a further 46.8% of the 2,3,5,6-tetrahydro-1-imidaz (1,2-a) imidazole.

Example II

A mixture of 1.45 parts of 1-(beta-aminoethyl)-2-imidazolidinethione and 2.16 parts of mercuric oxide in 30 parts of water was shaken at room temperature for 44 hours. The mercuric sulfide was removed by filtration and the filtrate was taken to dryness in vacuo, yield 1.06 parts. This product on analysis for 2,3,5,6-tetrahydro-1-imidaz (1,2-a) imidazole by precipitation as the picrate (M. P. 219–220° C.) gave a 33.6% yield of bicyclic material. The picrate did not depress the melting point of an authentic sample of 2,3,5,6-tetrahydro-1-imidaz (1,2-a) imidazole picrate (M. P. 219–220° C.).

Example III

To a solution of 1 part of 1-(beta-aminoethyl)-2-imidazolidinethione in 10 parts of hot ethanol was added 2.34 parts of silver nitrate in 25 parts of 50% aqueous ethanol. This mixture was refluxed for one hour and the precipitate of silver sulfide was removed by filtration. The remaining silver ion in the filtrate was precipitated as silver chloride in the presence of nitric acid. The filtrate on evaporation to dryness gave 1.27 parts of yellow oil. A portion (0.227 part) of this oil on treatment with a saturated aqueous picric acid solution gave 0.197 part (47%) of a crystalline picrate (M. P. 208–210° C.). One crystallization from ethanol raised the melting point to 218–220° C. It did not depress the melting point of a sample of the picrate of 2,3,5,6-tetrahydro-1-imidaz (1,2-a) imidazole (M. P. 219–220° C.) prepared by the method described in Example I.

Example IV 1-(beta-aminoethyl)-2-imidazolidinethione (4.35 parts) and chloroacetic acid (2.83 parts) in 100 parts of water was refluxed for two hours. This solution was taken to dryness under reduced pressure to give 7.2 parts of oil. This oil gave an 86.5% yield of the picrate (M. P. 190–195° C.) of 2,3,5,6-tetrahydro-1-imidaz (1,2-a) imidazole on addition of saturated aqueous picric acid solution. One crystallization from ethanol raised the melting point to 217–218° C. A mixed melting point determination with an authentic sample of 2,3,5,6-tetrahydro-1-imidaz (1,2-a) imidazole picrate (M. P. 218–219° C.) showed no depression.

We claim:
1. A process for making 2,3,5,6-tetrahydro-1-imidaz (1,2-a) imidazole, comprising heating 1-(beta-amino- ethyl)-2-imidazolidinethione in a solvent medium in the presence of chloroacetic acid as a desulfurization agent.

2. A process for making 2,3,5,6-tetrahydro-1-imidaz (1,2-a) imidazole, comprising heating 1-(beta-aminoethyl)-2-imidazolidinethione in water in the presence of chloroacetic acid as a desulfurization agent.

References Cited in the file of this patent
UNITED STATES PATENTS 2,782,205   McKay et al. _____ Feb. 19, 1957